United States Patent [19]

Hamers et al.

[11] Patent Number: 5,268,621
[45] Date of Patent: Dec. 7, 1993

[54] DIGITAL CONTROLLER FOR INCHWORM PIEZOELECTRIC TRANSLATOR

[75] Inventors: Robert J. Hamers; Xiang Chen; Marcus T. McEllistrem, all of Madison, Wis.

[73] Assignee: Wisconsin Alumni Research Foundation, Madison, Wis.

[21] Appl. No.: 953,430

[22] Filed: Sep. 29, 1992

[51] Int. Cl.⁵ ............................................. H01L 41/08
[52] U.S. Cl. .................................. 318/116; 310/317; 310/328
[58] Field of Search ............... 310/328, 323, 316–319; 318/116

[56] References Cited

U.S. PATENT DOCUMENTS 3,902,084  8/1975  May, Jr. ..................... 318/116 X
5,027,027  6/1991  Orbach et al. ..................... 310/317

OTHER PUBLICATIONS

Burleigh Instruments Inc. schematic (no date).
Jeon and Willis, "Inchworm Controller for Fine Approach in a Scanning Tunneling Microscope," *Journal of Vacuum Science Technology*, vol. 9, No. 4 (Jul./Aug. 1991).

*Primary Examiner*—Mark O. Budd
*Attorney, Agent, or Firm*—Quarles & Brady

[57] ABSTRACT

A controller for an inchworm type linear transducer is constructed so as to be extremely low noise and to permit very fine positioning. This is done by storing the desired output waveforms in digital form in an EEPROM memory array and then counting through the address locations of the memory array to re-create the desired waveform. An analog amplifier is used to actually drive the piezoelectric elements in the transducer.

12 Claims, 4 Drawing Sheets

DIGITAL CONTROLLER FOR INCHWORM PIEZOELECTRIC TRANSLATOR

FIELD OF THE INVENTION

The present invention relates to controllers for high accuracy linear translators and relates, in particular, to digital controllers for translators particularly adapted for use with scientific instrumentation.

BACKGROUND OF THE INVENTION

Many scientific instruments require fine positioning relative to an object to be analyzed or tested. For example, in using a scanning tunneling microscope (STM), it is necessary to be able to position the object to be scanned relative to the microscope in such a way that the microscope accurately scans the object. When the instrument operates on a very small scale, very fine positioning of the object is necessary to ensure successful operation of the instrument or examination of the object. Many times, positioning of an object within a single Angstrom range is necessary in order to achieve successful utilization of an instrument. This is most often done in the microscopic environment by placing either the microscope or the sample to be examined on a moveable mounting. The mounting is then translated in two orthogonal directions, under digital control, to position the sample relative to the microscope for examination. Accordingly, there has been significant effort to develop linear translating motors, and controllers for those motors, which are capable of operating on this scale.

One type of controller used to achieve fine adjustments of scanning tunneling microscopes is known as the "inchworm" linear translator. An inchworm translator consists of three piezoelectric components, two annular clamp components joined by a cylindrical drive component in the middle. The annular components are positioned on the axis of a shaft. This general arrangement is indicated in FIG. 1, where the two annular piezoelectric clamps are indicated at 12 and 14 and the connecting drive portion is indicated at 16. The shaft is indicated at 20. Electrical contacts are provided on the individual interior annular surfaces and the common exterior annular surface of both of the clamps 12 and 14 and the drive portion 16. The inchworm operates in a manner which gives it its name. A suitable electric field is applied to close one of the clamps, while the other is open. Then a suitable electric field is applied to elongate the drive portion between the two clamps. With the voltage held on the drive portion, the open clamp is then closed, and the closed clamp is then opened. The electric voltage on the drive portion is then released, thereby causing the drive portion to contract. Again, the voltages on the clamps are reversed and the process can be repeated. In this way, the drive portion inches down the shaft. Either the shaft or the inchworm body can be attached either to the mounting or to the sample.

Control electronics have been built which operate such inchworm motors in the prior art. Such controllers have been capable of operating an inchworm controller at high speeds, with reasonable accuracy, even with a maximum output voltage of 430 volts and with less than 0.5 millivolts of noise. Such a circuit is described by Jeon and Willis in *J. Vac. Sci. Technol. A*, 6:4, page 2418 (1991). For some very fine applications, even this degree of resolution and noise is insufficient, and further resolution and decrease in noise content of the driving signal is desirable.

SUMMARY OF THE INVENTION

The present invention is summarized by a controller for a piezoelectric inchworm translator which includes a memory array containing a digital representation of the desired driving waveforms. A counter is stepped in value by a clock circuit and the output of the counter selects values from the memory array. The output of the memory array is converted into analog voltage and then amplified for presentation to the piezoelectric elements.

The present invention is also summarized in that a low-noise, high-performance inchworm controller is described which operates on a digital basis and achieves less than 2 millivolts of noise over a wide bandwidth of operational speeds.

It is an object of the present invention to provide a low-noise high-performance digital controller for a linear translator of the inchworm category which achieves high resolution with low noise.

It is a further object of the present invention to provide such a controller which is durable, robust, yet is still economical in its construction and operation.

Other objects, advantages, and features of the present invention will become apparent from the following specification when taken in conjunction with the accompanying drawings.

DETAILED DESCRIPTION OF THE INVENTION

In order to understand the present invention, it is important to recognize the importance of having a low-noise signal to control the operation of an inchworm linear translator. Referring again to FIG. 1, note that the three piezoelectric portions, including the two annular clamps 12 and 14 and the cylindrical drive portion 16, all have a common compensating electrode 22 which is a cylindrical electrode formed on the outside of the inchworm translator. Each of the respective piezoelectric elements, i.e. clamps 12 and 14 and drive portion 16, have their own respective internal, or driving, electrodes. Thus, the piezoelectric movement which occurs in each of the three piezoelectric elements results from the difference in voltage between the electrode associated with the piezoelectric element and the common electrode 22. The common electrode 22 is typically held at a fixed potential, usually ground. It is the voltage applied to the central extending, or drive portion 16, that produces the translation. Since it is the translational movement which is desired to be as accurate as possible, it is critical that the voltage applied to the drive portion 16 be as quiet as possible, i.e. have as little noise element as possible. Excess noise would result in inaccuracies in the distance of movement. The voltages to be applied to the two clamps 12 and 14 are slightly less critical. However, even for the voltages applied to the clamps, a sudden expansion or contraction produced by changing the voltage rapidly over a wide voltage swing, e.g. 500 volts, could lead to jerking of the inchworm. The entire device operates smoother if the voltages to the clamps are ramped on and off, rather than subject to instantaneous changes in voltage. The controller described below uses smooth ramp voltages when changing all the voltages on the drive portion, or extender, as well as to the clamps.

The inchworm controller consists of two separate types of modules. One module is a low-voltage digital module which generates the three wave forms used, one each for the drive portion and the two clamps. The low-voltage signals are then each coupled to a separate high-voltage analog amplifier circuit, each of which boosts the voltage level from the digital circuit to the high voltage level necessary to drive the piezoelectric elements.

Figure 2:
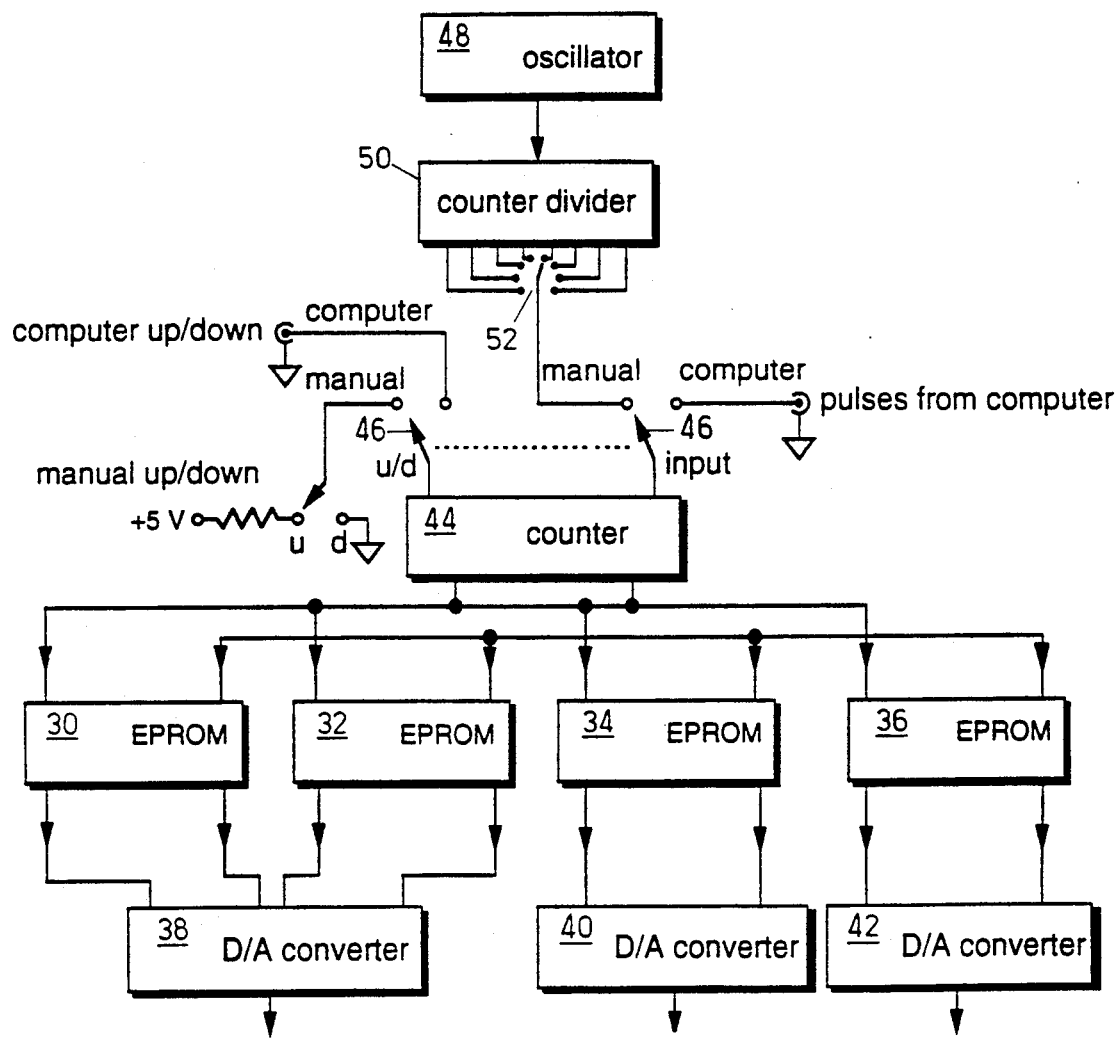
FIG. 2 is a schematic block diagram of the digital portions of the controller constructed in accordance with the present invention.

Shown in FIG. 2 is a block diagram of the digital module of the controller in accordance with the present invention. In the center of the circuitry are four fast erasable, programmable read-only memories (EPROMs) 30, 32, 34 and 36. The EPROMs serve as a memory array and are preprogrammed to store in a table the digital output values which will produce the shape of the waveform desired to be applied to each of the piezoelectric elements. Shown in Table 1 at the end of this specification is a logic table for the value stored in each of the EPROMs 30-36. In its preferred embodiment, each of the EPROMs is a 64k by eight-bit EPROM, and thus, the combination of the four EPROMs illustrated in FIG. 2 is capable of the full cycle of addresses and values presented in Table 1.

The output to each of the EPROMs consists of eight digital data bits which are presented to three digital to analog converters, designated 38, 40, and 42. The digital to analog converter 38 receives as its least significant seven bits of input seven of the output bits from EPROM 32. The digital to analog converter 38 is also connected to receive as its most significant seven bits of input the first seven bits of output from the EPROM 30. Thus, the sixteen-bit digital to analog converter 38 is only wired here to operate over fourteen bits. The digital to analog converter 40 is an eight-bit converter which receives it output directly from the EPROM 34. The digital to analog converter 42 receives its eight input bits from the eight output bits of the EPROM 36. The digital to analog converter 38 supplies an output voltage to drive the drive portion of the translator, while the digital analog converters 40 and 42 are intended to drive the respective clamps.

The input to each of the EPROMs 30, 32, 34, and 36 is provided by a sixteen-bit up/down binary counter 44. The sixteen-bit counter may optionally be made by two eight-bit synchronous counters arranged in cascade. The sixteen-bit counter 44 has its input connected to a switch 46, which allows the counter 44 to be operated either by a manual user or by a remote computer connected to digitally control the operation of the circuit. The switch 46 consists of two ganged poles. One pole is connected to control the clock input to the counter 44, and the other pole is connected to control the direction of count, i.e. up or down. The manual clock input is provided by a crystal oscillator 48, the output of which is fed to a counter/divider 50 which divides down the rate of count in a manually selectable fashion to control the rate of skew of the controller. The rate of skew is controlled by a rotary switch 52, which manually can connect any one of the outputs of the counter/divider 50 to the clock input to the counter 44. The oscillator 48 and counter/divider 50 thus serve as a clock circuit producing a regular train of pulses of constant interval. The up/down input to the counter 44 is controlled either manually, by a simple single-post double-throw switch, or under digital control from the remote computer.

Figure 3:
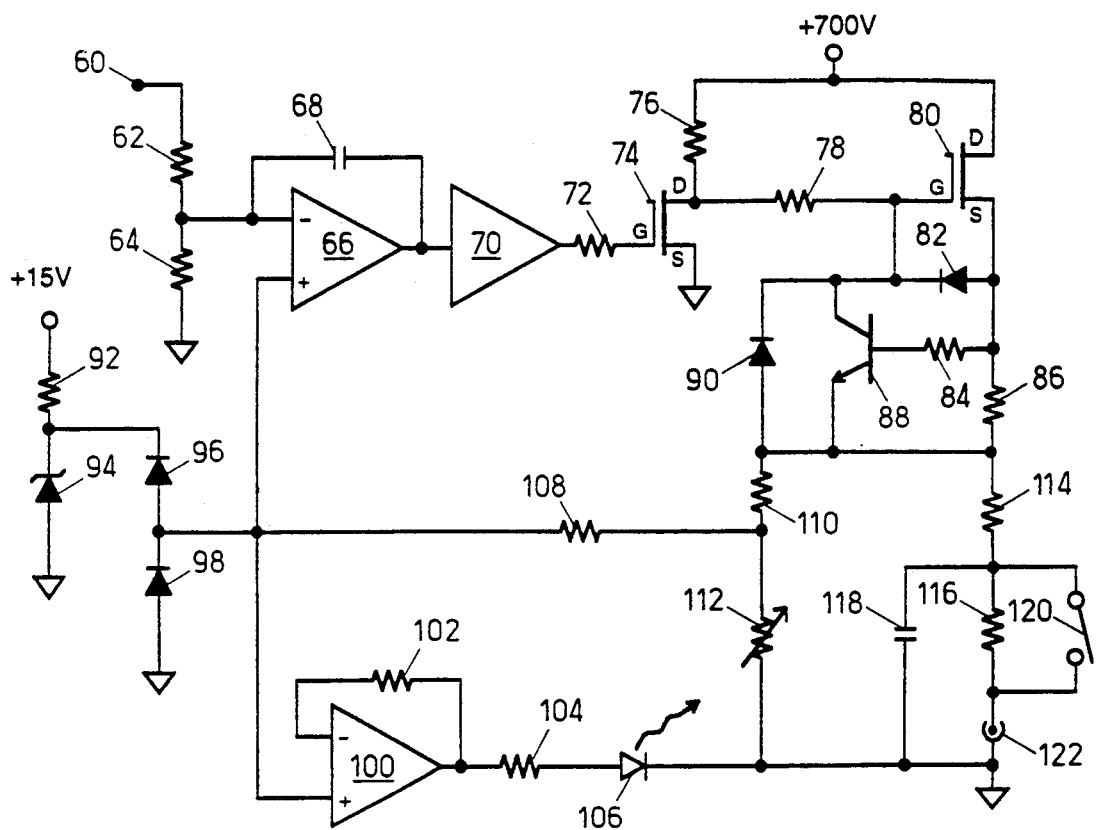
FIG. 3 is a circuit diagram of the analog portions of the controller constructed in accordance with the present invention.

FIG. 3 illustrates the analog portion of the circuitry. There are actually three analog amplifiers of the type illustrated in FIG. 3, one for each of the piezoelectric elements. Designated at 60 is the digital input, from the digital circuit of FIG. 2, which is connected to two resistors 62 and 64 connected in series. The junction of the resistors 62 and 64 as connected to the inverting input of a first operational amplifier 66, which has a capacitor 68 connected between its output and its inverting input. The output of the operational amplifier 66 is connected as an input to an operational amplifier 70. The output of the operational amplifier 70 is connected through a resistor 72 to the gate terminal of a MOSFET 74. The source of the MOSFET 74 is connected to ground, while the drain is connected through a resistor 76 to the positive potential voltage, here 700 volts, and also through a resistor 78 to the gate of a second MOSFET 80. The drain of the MOSFET 80 is connected to the 700 volt supply voltage, while the source of the MOSFET 80 is connected to the anode of a diode 82 whose cathode is connected to the gate of the MOSFET 80. The source of the MOSFET 80 is also connected to the junction of two resistors 84 and 86. The other end of the resistor 84 is connected to the base of a transistor 88, the collector of which is also connected to the gate of the MOSFET 80. The emitter of the transistor 88 is connected to the other end of the resistor 86. A diode is connected between the collector and emitter of the resistor 88, with the anode of the diode 90 being connected to the collector of the transistor 88.

Separately, a fifteen volt supply voltage is connected to a resistor 92 connected in series with a Zener diode 94. The junction of the resistor 92 and the Zener 94 is connected to the series connection of diodes 96 and 98, which are connected with their cathodes oriented toward ground. The junction of the diodes 96 and 98 is connected to the non-inverting input of the operational amplifier 66 and also to the non-inverting input of another operational amplifier 100. The output of the operational amplifier 100 is connected through resistor 102 back to its own inverting input. The output of the operational amplifier 100 is connected through resistor 104 to the cathode of a light emitting diode (LED) 106, the anode of which is connected to ground. The non-inverting inputs of the operation amplifiers 66 and 100 are also connected through a resistor 108 to the junction of a resistor 110 and a potentiometer 112. The other side of resistor 110 is connected to the emitter of the transistor 88, while the other end of the potentiometer 112 is connected to ground. Also connected to the emitter of the transistor 88 is one end of resistor 114 connected to ground in series with a resistor 116. A capacitor 118 is connected in parallel with resistor 116, and a switch 120 is also connected in parallel with the resistor 116. The output to the inchworm piezoelectric element is indicated at 122.

Figure 1:
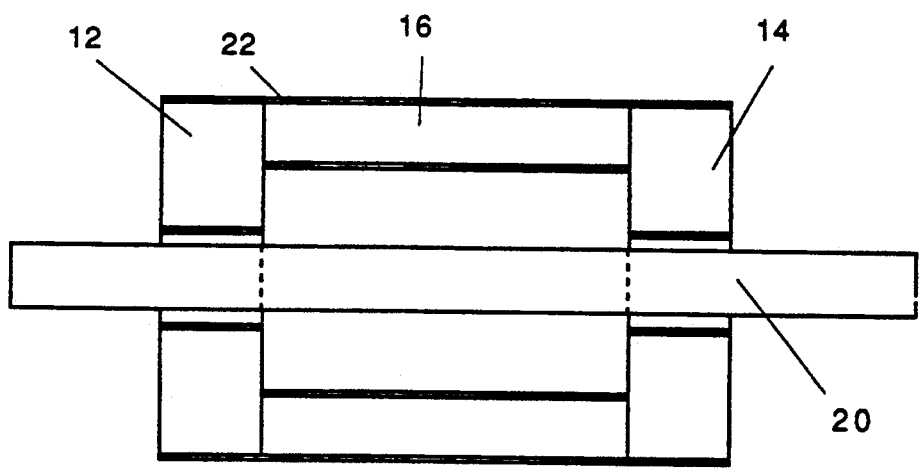
FIG. 1 is a cross-sectional view of an inchworm linear translator for use in conjunction with the present invention.

In its operation, the electrical circuit of FIGS. 2 and 3 is intended to create appropriately timed and shaped ramp voltages so as to drive the piezoelectric elements of an inchworm translator of the type in FIG. 1. Referring first to the digital circuitry of FIG. 2, the set of EPROMs 30, 32, 34, and 36, serve, in essence, as a memory array holding a look-up table containing all the possible states of the voltages to be applied to the respective piezoelectric elements. The counter 44 is connected to those EPROMs, as their input, to sequentially drive the input to the EPROMs through a numerical sequence incrementally upward. The logic sequence of the output from the EPROMs is illustrated in Table 1. The address column in Table 1 shows the input values from the counter 44, and for each input value, the output of each of the EEPROMs is presented in hexadecimal. Thus, for example, when the counter 44 is at zero, the EPROMs 30 and 32 have all zeros as their output, the EPROM 34 has all zeros as its output, and the output of the EPROM 36 consists of an eight-bit word of all ones, indicated by the hexadecimal FF shown in Table 1. These outputs are maintained by the EPROMs as the clock 44 steps from address zero to address 397. This is thus a pause time period for transient die-out. When the counter reaches 398, EPROMs 30, 32, and 36 remain unchanged, while, between counts 398 and 653, the EPROM 34 slowly increments its output in individual steps from an output of one to an output of 256, or hexadecimal FF. This corresponds to the time period in which the rearward clamp is closing while the forward claim remains closed, and the drive portion of the inchworm translator is not energized.

Subsequently, between counts 654 and 1051, the EPROMs all maintain constant output during another pause to permit transients to expire. Then, beginning with count 1052 and continuing to count 1308, the value from EPROM 36 is slowly decremented, beginning with the value of FF and ending with the value of zero. Thus, during this time period, the voltage to be applied to forward clamp is slowly reduced and forward clamp is opened. Then, from count 1309 to count 1706, the situation is maintained, with the clamp controlled by EPROM 34 remaining closed and the clamp controlled by EPROM 36 remaining open. Again, no drive force is applied to the drive portion of the piezoelectric translator.

Then, beginning with step 1707, the combined output of EPROMs 30 and 32 is incremented steadily. With each count between counts 1707 and 18090, an increment of two is applied to the combined output of EPROMs 30 and 32 as applied to the digital to analog converter 38. Thus, throughout this time period, the total output digital value is incremented by two for each count of the counter 44. This represents the time period in which the drive voltage is applied to the drive portion 16 of the inchworm translator. When the maximum voltage, i.e. 500 volts, is applied to the drive portion 16, the combined value at the output of the EPROMs 30 and 32 is represented by the hexadecimal 7FFE.

Thereafter, in counts 18091 to 18489, the situation is maintained, with the clamp connected to EPROM 34 closed and the clamp connected to EPROM 36 open, while the drive portion is maintained in a steady state. This is another pause. Thereafter, beginning with counts 18490 to 18745, the output of EPROM 36 is incremented by one with each count, to slowly close the forward clamp controlled by EPROM 36. After another pause, represented by counts 18746 to 19142, at count 19143 through 19398, the value at EPROM 34 is decremented by one for each step, to thereby open the rearward clamp connected to EPROM 34. Again, the values from 19399 to 19796 represent a pause.

Finally, beginning on count 19797, and continuing through count 21844, the voltage to the drive portion is contracted. During this interval, the output of the combined EPROMs 30 and 32 is decremented by sixteen for each step of the counter 44. Thus, on the retracting phase, the drive portion is driven much faster than on the expansion phase. At the end of count 21844, the entire procedures of counts 0 through 21844 is repeated two times, as indicated at the bottom of Table 1.

The output of each of the digital to analog converters 38, 40, and 42 are connected to a respective one of the analog driving circuits as illustrated in FIG. 3. In each analog circuit, high voltage is applied from a single high voltage power supply adjusted to an output of 700 volts DC. The two high-voltage MOSFETs 74 and 80 are connected so as to form a quasi push-pull amplifier. Both the low noise characteristics, and the linear operation, of the high voltage section of the amplifier are achieved by the use of active feedback. The active feedback is provided by resistors 110 and 112, which function as a voltage divider to sample the output voltage and reduce it to the range of 0 to 10 volts, which is then imposed back through the resistor 108 to the amplifiers 66 and 70 to close the active feedback loop. The gain of the high voltage section can therefore be adjusted simply by adjusting the potentiometer 112, to increase or decrease the feedback and thus change the gain of the entire analog amplifier board. An adjustment of potentiometer 112 provides a 10 volt input signal to the inverting input of operational amplifier 66, which generates a 500 volt output voltage range at the output 122, which is suitable for most inchworm driving applications. With this circuit, voltages as high as 900 volts can theoretically be used, but the highest voltage of the system is limited by the voltage rating of the MOSFETs. Due to the danger of arcing, it is not advisable to adjust the high voltage supply over 700 volts DC.

Since the MOSFETs 74 and 80 have a high input impedance at their gate, a relatively large amount of current is needed to drive the gate rapidly to ensure fast switching. In the circuitry of FIG. 3, the ability to drive the gate of MOSFET 74 rapidly is assured by the provision of the operational amplifier 70, which functions as a current booster to the output of the operational amplifier 66. The diodes 96, 98, and 94 are intended to provide input protection to the amplifier 66, to prevent fast high voltage transients at the output of the circuitry from exceeding the 15 volt supply, and input limit, on the operational amplifier 66. The operational amplifier 100 is included to drive the light emitting diode 106, located on the front panel of the controller device. This light emitting diode is provided to give a visual indication as to the status of each high voltage wave form, i.e. providing a light indication when the output voltage is high. Because the MOSFETs 74 and 80 can be damaged if it were to happen that their gate was driven negative with respect to their source, it is important to ensure that the gate of MOSFET 74 does not go far below ground. This is done by powering all three of the operational amplifiers 66, 70, and 100 with plus 15 volts and ground rather than the standard supply voltages of plus and minus 15 volts DC. The final output of each high voltage amplifier stage is also fused with a 1/64th-amp fast-blow fuse, before passing into the connector connected to the inchworm.

A constant DC supply voltage needs to be applied to the fourth, or clearance compensation, electrode of the inchworm device. This is done using the same high voltage supply utilized for the high voltage amplifier boards. A voltage divider is simply made using fixed resistors and a potentiometer and connected so as to provide an adjustable output voltage for the clearance compensation electrode. A large capacitor may also be used in the voltage divider to absorb transients and to eliminate noise on this particular output as well.

Figure 4:
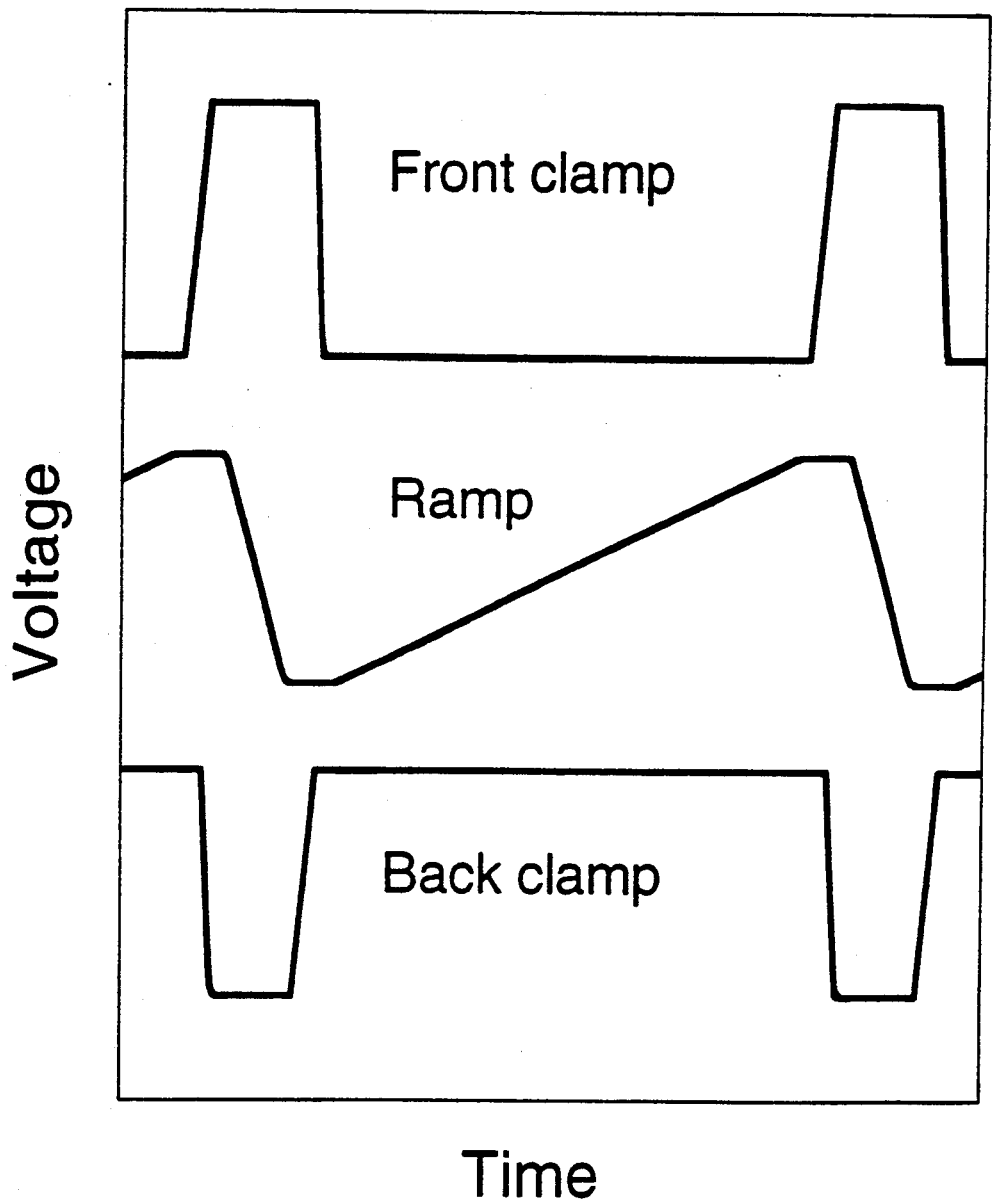
FIG. 4 illustrates a timing diagram of the circuitry of FIGS. 2 and 3.

Illustrated in FIG. 4 is a timing diagram of the voltages applied to the three parts of the piezoelectric device. The top signal is the voltage applied to the front clamp, the bottom signal is the voltage applied to the back clamp, and the signal in between is that applied to the drive portion 16 of the inchworm device. In each of the signals, when the voltage is high, the piezoelectric material is enlarged. As can be seen, the voltages achieved are those which are directly implemented by the digital values in Table 1 and expressed directly from the EPROMs, converted into analog form, and expressed through the circuits of FIG. 3 directly to the driving components.

The performance of the system constructed in accordance with this present invention is impressive. The most important properties are high dynamic response, i.e., good speed in reaching of the desired levels, and a very low noise level. Fast speed is advantageous particularly when it is desired to move the inchworm translator long distances requiring multiple operations. Low noise is absolutely necessary, to keep inchworm position constant, particularly in experiments using a STM where the tip is scanned using three separate one dimensional scanners. The dynamic response of the controller is limited only by the high voltage section, which has a constant frequency response out to approximately 3.5 kilohertz. Using this device, and at various ranges of frequency, RMS noise was found to be 1.9 millivolts, 2.0 millivolts, and 2.0 millivolts, respectively. Assuming that a 500 volt wave-form produces a 1 micron extension of the inchworm translator, a standard noise level of 2 millivolts corresponds to an RMS variation in length of 0.04 Angstroms, well within the tolerances desired of the device. The output noise increases slightly at higher operational voltages, but remains negligibly small over the entire range of operation. The 2 millivolt noise level thus achieved is substantially better than can be obtained from current commercial controllers and is sufficiently small such that it can be neglected in all but the most sensitive STM measurements.

In some instances it may be desired that the noise be reduced even further, particularly when the inchworm device is held in a constant position. When it is desired to hold the inchworm at a fixed position for a long time, an extra RC filter can be placed in the output which can be switched in and out via the switch 120. To filter the noise, the switch 120 is opened.

Several features of the inchworm controller of the present invention permit its fine control. Note that the rotary switch 52 allows the selection of which of the outputs of the counter divider 50 is fed as an input to the counter 44. This allows the clocking rate through the waveform table to be selected by the user, to thus control the rate of travel of the transducer. The provision for the potentiometer 112 in the amplifier of FIG. 3 allows the level of maximum output voltage to the piezoelectric element to be adjusted.

The controller is also adapted for its most precise operation under computer control. If the switch 46 is operated, the counter divider 50 is disconnected and then the counter 44 can receive its inputs directly from an external computer. In this computer-controlled mode, the computer can monitor, through other sensors or feedback mechanisms, the actual position of the article being moved, and can cease sending pulses to the counter 44 when the desired location is reached. For example, for scanning tunnelling microscopes (STMs), it is desired that the tip of the microscope be less than 10 Angstroms from the sample, but that it never touch the sample. The controller of the present invention can accomplish that objective. While the normal overall linear distance achieve by a single waveform cycle (e.g. steps 0 to 21844 of Table 1) is on the order of a micron, the linear distance corresponding to each address location in the memory array is less than 2 Angstroms. Thus, if the computer is monitoring STM location, it can step through the addresses to bring the STM to within 10 Angstroms of the sample, and then it can simply hold position. The flexibility for this fine control arises from the size of the address table, since the $2^{14}$ steps permit the subdivision of the cycle of inchworm travel into these very small increments.

The present invention is subject to many variations in details and parts, but it is understood that the present invention embraces all such modified forms thereof as come within the scope of the following claims.

TABLE 1

| ADDRESS | EPROM 30 AND 32 | EPROM 34 | EPROM 36 |
|---|---|---|---|
| 0 to 397 | 0000 | 00 | FF |
| 398 to 653 | 0000 | 01 to FF | FF |
| 654 to 1051 | 0000 | FF | FF |
| 1052 to 1308 | 0000 | FF | FF to 00 |
| 1309 to 1706 | 0000 | FF | 00 |
| 1707 to 18090 | 0000 by 2s to 7FFE | FF | 00 |
| 18091 to 18489 | 7FFE | FF | 00 |
| 18490 to 18745 | 7FFE | FF | 00 to FF |
| 18746 to 19142 | 7FFE | FF | FF |
| 19143 to 19398 | 7FFE | FF to 0 | FF |
| 19399 to 19796 | 7FFE | 00 | FF |
| 19797 to 21844 | 7FFE by 16s to 0000 | 00 | FF |
| 21845 to 43679 | repeat of 1-21844 | repeat of 1-21844 | repeat of 1-21844 |
| 43680 to 65535 | repeat of 1-21844 | repeat of 1-21844 | repeat of 1-21844 |

We claim:

1. A controller for controlling the operation of an inchworm translator including three piezoelectric elements, a pair of clamps joined by a drive portion, the controller comprising:

a clock circuit providing a constant clock pulse;

a counter connected to the clock circuit and capable of counting the clock pulses therefrom;

a memory array connected to the counter and containing a table of digital values corresponding to the desired voltage waveform to be applied to the piezoelectric elements;

three digital to analog converters connected to the output of the memory array to create analog voltages from the digital values therein; and an analog output amplifier to amplify the output each one of the digital to analog converters to drive a respective piezoelectric element, the waveform of the voltage applied to the piezoelectric elements thus being determined by the table of values in the memory array.

2. A controller as claimed in claim 1 wherein the counter is an up/down counter and the direction of counting is selectable so that the same table of values can be used to drive the transducer in either direction.

3. A controller as claimed in claim 2 wherein the direction of count of the counter is manually selectable.

4. A controller as claimed in claim 1 wherein the memory array is a set of EEPROMs.

5. A controller as claimed in claim 1 wherein the voltage waveform applied to the drive portion of the transducer is a linear ramp voltage.

6. A controller as claimed in claim 1 wherein the values in the table include constant sets of values after operation of each piezoelectric element to pause between movement of elements to allow time periods for transients to die off.

7. A controller as claimed in claim 1 wherein the output amplifiers each includes adjustable voltage scaling means for selecting the overall range of analog voltage applied to the piezoelectric element.

8. A controller as claimed in claim 1 wherein the table of digital values includes on the order of $2^{14}$ values.

9. A controller as claimed in claim 1 wherein each successive digital value in the table when applied to the drive portion of the controller results in a difference of translation of no more than about 2 Angstroms.

10. A method for controlling the operation of an inchworm translator to allow control of position down to the Angstrom range, the inchworm translator including three piezoelectric elements, a pair of clamps joined by a drive portion, the method comprising the steps of:

providing a memory array containing a table of digital values corresponding to incremental positions of the piezoelectric elements;

continuously converting the digital output of the memory array into analog voltages which are applied to the piezoelectric elements;

stepping through the array to close a rear one of the clamps;

stepping through the array to open a forward one of the clamps;

stepping through the array to actuate the drive portion while at the same time monitoring the amount of translation; and ceasing stepping of the array to cease movement of the drive portion when the precisely desired amount of movement is achieved.

11. A method as claimed in claim 10 wherein between the stepping steps there are delay time periods to permit transients to die out.

12. A method as claimed in claim 10 wherein each of the steps of the array to actuate the drive portion corresponds to a movement of about 2 Angstroms.

* * * * *